Sept. 29, 1931.  H. H. HECKMAN  1,825,314
ELECTRODE HOLDER
Filed Jan. 30, 1928
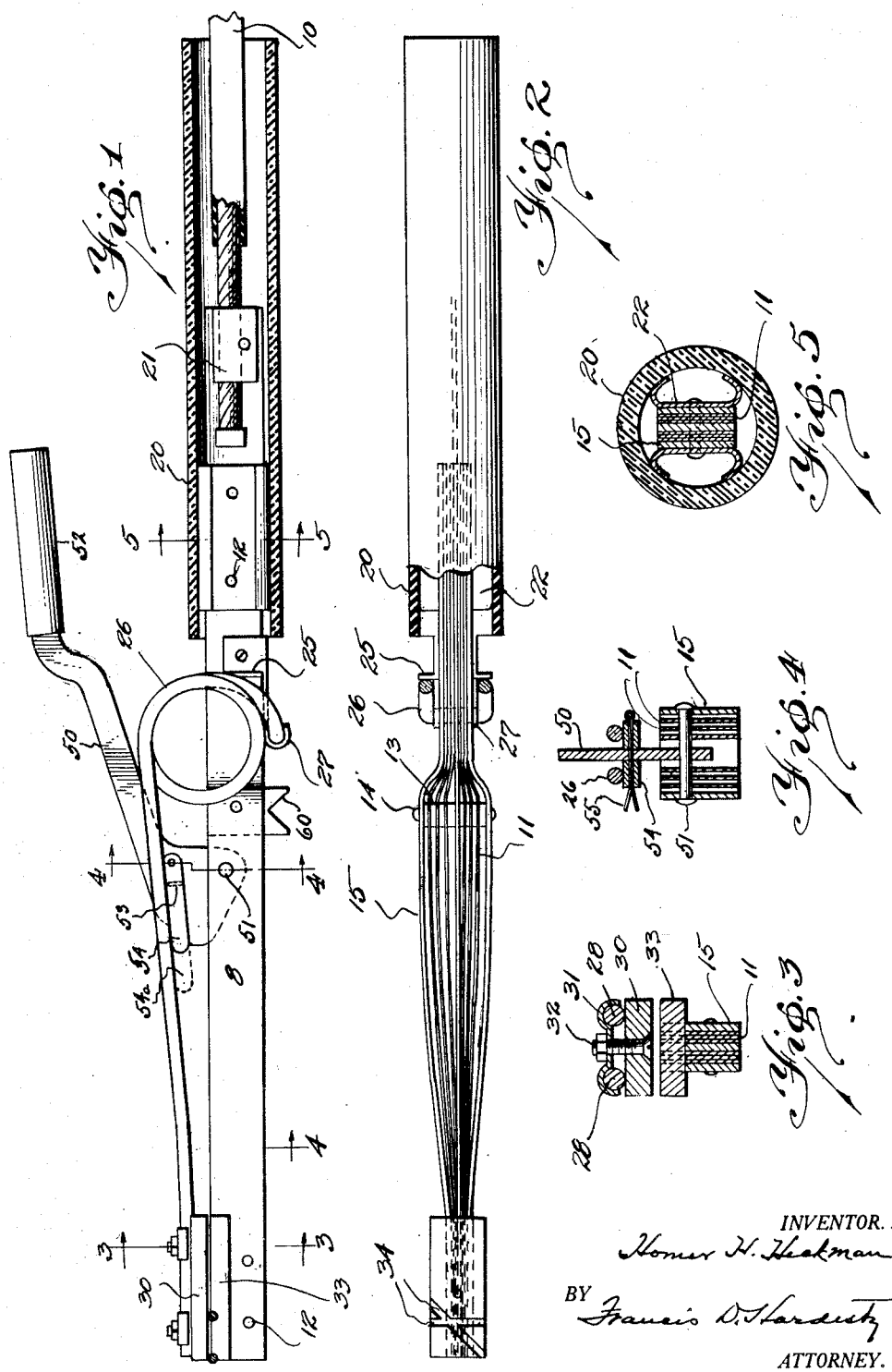
INVENTOR.
Homer H. Heckman
BY Francis D. Hardesty
ATTORNEY.

Patented Sept. 29, 1931

1,825,314

UNITED STATES PATENT OFFICE

HOMER H. HECKMAN, OF DETROIT, MICHIGAN, ASSIGNOR TO HOWARD HANNA, OF DETROIT, MICHIGAN

ELECTRODE HOLDER

Application filed January 30, 1928. Serial No. 250,455.

The present invention relates to electrode holders for arc welding and has among its objects an electrode holder which shall be lighter in weight and therefore more easily handled than the known holders.

Another object is a holder which is adapted to dissipate the heat of the welding operation to a large degree before it can be conducted back to the handle of the device.

Still other objects will readily occur to those skilled in the art upon reference to the following description and the accompanying drawings, in which:—

Figure 1 is a side elevation of the holder with parts in section;

Figure 2 is a plan view thereof, with parts in section;

Figures 3, 4 and 5 are vertical sections on the lines 3, 4 and 5 respectively of Figure 1.

As indicated in the drawings, the holder comprises a main conductor 8 which forms the body of the holder and is connected through a suitable cable 10 to a source of current supply. This body member 8 consists of a plurality of thin plates 11 of good conducting material, such as copper or aluminum securely riveted together at their ends, as indicated at 12, and spread apart in their intermediate portion and spaced in this position by spacers 13. A long rivet 14 or bolt may pass through the strips and spacers to maintain the spaced relation. If desired, the two outer layers 15 may be somewhat heavier material to prevent accidental bending and to protect the inner layers.

The rear end of the conductor body 8 extends into a tubular handle 20 and is provided with suitable means, such as a clip 21 for the connection of cable 10. It is preferred, also to provide on either side of the enclosed portion of the body member, spacing elements 22 fitting snugly within the handle 20. It is preferred to make these spacing elements of sheet fiber or metal bent to channel form so that the handle 20 may have free access of air endwise therethrough.

Immediately in front of the handle, it is preferred to provide shoulders 25 against which abuts the coil portion of a spring 26 and on the under side of the body a second abutment or hook 27 cooperating with the shoulder 25 to properly hold the spring 26 against turning.

From the coil portion of the spring 26, the ends thereof 28 extend forward to the front end of the body portion and are securely fastened upon the top of a jaw member 30 by means of clips 31 and bolts 32. This jaw member is adapted to cooperate with a second jaw member 33 secured to the forward end of the body portion and both jaw members 30 and 33 may be provided with suitable grooves 34 for gripping the welding electrode.

Preferably well back from jaws 33 a lever 50 is pivoted to the conductor body 8 as at 51. This lever extends back over the handle 20 and is provided with suitable insulation 52 at its free end. The forward end or short arm, of the lever is preferably notched as at 53 for the reception of a lifter plate or member 54 which is also notched and is adapted to slide into notch 53 under the spring 26 and be secured by suitable means such as cotter pin 55. If desired, a longer plate 54ª may be used to increase the opening of the jaws.

Also, as it is necessary to remove the flux coating from the welding rods used with such holders, in order to get good electric contact, a scraper 60 may conveniently be attached to the holder as shown.

By forming the main conducting body portion 8 of the holder of the comparatively thin strips of good conducting material, it is possible to provide a sufficiently large current lead with less metal than has heretofore been used and by spacing apart the strips as shown, a very much larger heat dissipating surface is provided for the conductor as well as means for increasing the stiffness of this portion of the device.

While the device has been described as having the strips 11 and 15 of copper or other good conducting metal, it may sometimes be found desirable to use such good conducting metal for the thinner strips 11 and steel or some other stronger metal for the outside strips 15.

Now having described the invention and the preferred form of embodiment thereof, it is to be understood that the said invention is to be limited not to the specific details herein set forth and illustrated but only by the scope of the claims which follow.

I claim:—

1. An electrode holder comprising a pair of jaws adapted to hold a welding electrode, one of said jaws being fixed to a conducting body portion, and the other being movable toward and away from the first jaw, said body portion being made of a plurality of thin strips spaced from each other.

2. In an electrode holder for arc welding, a body consisting of strips of good conducting metal provided at one end with an electrode holding jaw and at its other end with means for connecting to a source of current supply, an insulating handle over said connecting means, and means for spacing said strips from each other in the intermediate portion of their length.

HOMER H. HECKMAN.